(12) United States Patent
Van Ruijven

(10) Patent No.: US 8,783,581 B2
(45) Date of Patent: Jul. 22, 2014

(54) COOLANT AND POTABLE WATER HEATER

(75) Inventor: Edward Van Ruijven, White Rock (CA)

(73) Assignee: International Thermal Investments Ltd., Richmond, British Columbia (CA)

( * ) Notice: Subject to any disclaimer, the term of this patent is extended or adjusted under 35 U.S.C. 154(b) by 942 days.

(21) Appl. No.: 12/270,806

(22) Filed: Nov. 13, 2008

(65) Prior Publication Data

US 2009/0179079 A1    Jul. 16, 2009

Related U.S. Application Data

(60) Provisional application No. 60/987,772, filed on Nov. 13, 2007, provisional application No. 61/102,727, filed on Oct. 3, 2008.

(51) Int. Cl.
| | |
|---|---|
| B60H 1/00 | (2006.01) |
| F24H 1/28 | (2006.01) |
| F24H 1/08 | (2006.01) |
| F24H 9/20 | (2006.01) |
| F24H 1/00 | (2006.01) |
| F24H 1/06 | (2006.01) |

(52) U.S. Cl.
CPC ............... F24H 1/06 (2013.01); F24H 1/285 (2013.01); *F24D 2220/048* (2013.01); F24H 1/08 (2013.01); F24H 9/2035 (2013.01); F24H 1/009 (2013.01)
USPC ........................................ 237/12.3 B; 392/441

(58) Field of Classification Search
USPC ........................................ 237/12.3 B; 392/441
See application file for complete search history.

(56) References Cited

U.S. PATENT DOCUMENTS

| | | | | |
|---|---|---|---|---|
| 1,847,431 A | * | 3/1932 | Hanna | 122/149 |
| 1,992,789 A | * | 2/1935 | Veale | 237/8 A |
| 2,200,397 A | * | 5/1940 | Monson | 165/277 |
| 3,028,843 A | * | 4/1962 | Carlson et al. | 122/18.3 |
| 3,155,089 A | * | 11/1964 | Hoyt | 126/343.5 R |
| 3,521,704 A | * | 7/1970 | Bridegum | 165/70 |
| 3,645,327 A | * | 2/1972 | Henley | 165/51 |
| 3,777,975 A | * | 12/1973 | Kofink | 237/12.3 A |
| 4,771,762 A | * | 9/1988 | Bridegum | 122/14.22 |
| 4,875,465 A | * | 10/1989 | Kramer | 122/18.3 |
| 4,981,112 A | * | 1/1991 | Adams et al. | 122/19.2 |
| 5,067,652 A | * | 11/1991 | Enander | 237/81 |

(Continued)

FOREIGN PATENT DOCUMENTS

| | | | | |
|---|---|---|---|---|
| JP | 59115916 A | * | 7/1984 | F23N 5/24 |
| JP | 10141680 A | * | 5/1998 | F24D 3/10 |

*Primary Examiner* — Kang Hu
*Assistant Examiner* — Phillip E Decker
(74) *Attorney, Agent, or Firm* — John Russell Uren

(57) ABSTRACT

A coolant heater having a coolant tank and a burner tube within the coolant tank is used for marine and motor coach installations. The burner tube is offset sidewise from the center line of the coolant tank to allow an exhaust manifold to be positioned within the coolant tank and beside the burner tube which allows a predictable coolant movement to more evenly distribute the heat throughout the coolant. An exhaust manifold is positioned within the coolant tank in the space obtained by the burner tube offset which allows an "up" or "down" exhaust duct configuration depending on the heater installation. An expansion tank connected to the coolant tank has a level switch located within the expansion tank and a pump is operably connected to the expansion tank and to the level switch. The pump terminates operation when the level switch indicates low coolant in the expansion tank.

10 Claims, 7 Drawing Sheets

(56) References Cited

U.S. PATENT DOCUMENTS

| | | | | |
|---|---|---|---|---|
| 5,190,025 A * | 3/1993 | Chen | | 126/19.5 |
| 5,927,961 A * | 7/1999 | Robinson et al. | | 431/207 |
| 5,960,157 A * | 9/1999 | McGraw | | 392/308 |
| 6,332,580 B1 * | 12/2001 | Enander et al. | | 237/2 A |
| 6,572,026 B2 * | 6/2003 | Enander et al. | | 237/12.3 B |
| 6,594,447 B2 * | 7/2003 | Rixen | | 392/496 |
| 6,612,504 B2 * | 9/2003 | Sendzik | | 237/12.3 B |
| 6,732,940 B2 * | 5/2004 | Enander et al. | | 237/2 A |
| 6,883,467 B2 * | 4/2005 | Holden | | 122/3 |
| 7,007,857 B2 * | 3/2006 | Enander et al. | | 237/12.3 B |
| 7,020,386 B2 * | 3/2006 | Scime et al. | | 392/441 |
| 7,036,746 B2 * | 5/2006 | Murgu et al. | | 237/12.3 B |
| 7,277,627 B2 * | 10/2007 | Hughes et al. | | 392/441 |
| 7,766,247 B2 * | 8/2010 | Wilnechenko et al. | | 237/12.3 B |
| 2003/0010835 A1 * | 1/2003 | Murgu et al. | | 237/12.3 B |
| 2004/0032032 A1 * | 2/2004 | Erickson | | 261/93 |
| 2005/0139690 A1 * | 6/2005 | Wilnechenko et al. | | 237/12 |
| 2005/0258263 A1 * | 11/2005 | Robinson | | 237/12.1 |
| 2005/0284948 A1 * | 12/2005 | Robinson et al. | | 237/12.3 R |
| 2007/0237501 A1 * | 10/2007 | Kloster | | 392/441 |
| 2010/0308121 A1 * | 12/2010 | Wilnechenko et al. | | 237/32 |
| 2011/0185986 A1 * | 8/2011 | Ohno et al. | | 122/18.1 |

* cited by examiner

COOLANT AND POTABLE WATER HEATER

CROSS REFERENCE TO RELATED APPLICATIONS

This application claims priority from United States provisional patent application Ser. No. 60/987,772 filed Nov. 13, 2007 and entitled COMBINATION WATER AND COOLANT HEATER and from United States provisional patent application Ser. No. 61/102,727 filed Oct. 3, 2008 and entitled COOLANT AND POTABLE WATER HEATER.

INTRODUCTION

This invention relates to a heater and, more particularly, to a heater used primarily in recreational vehicles and boats and which allows operating components of the heater to be contained within a single enclosure in an efficient configuration.

This invention relates to a heater used for heating potable water and for space heating surroundings and, more particularly, to a heater used for such applications where the heat exchanger is combined with the burner in a single casing.

BACKGROUND OF THE INVENTION

Recreational vehicles, motor homes, trucks, boats and the like, particularly those of the larger variety, often have a plurality of water and coolant circuits. A first circuit may extend from the engine of the vehicle or boat and is typically used for heating the interior or the vehicle or boat. A second circuit may extend from an auxiliary heater which may also be used for heating when the engine is not operating. A third circuit may extend from a source of potable water used for cooking and other personal use. To assist in the significant movement of coolant and potable water, it may be required to use two or more heaters or additional pumps to supply the necessary thermal energy for the heating and also for fluid movement. Of assistance to the flexibility of the system is the distribution module disclosed in our United States patent application serial no. 20050284948 entitled DISTRIBUTION MODULE FOR WATER HEATER filed Dec. 29, 2005, the contents of which are incorporated herein by reference.

For smaller motor coaches and smaller boats, the use of a distribution module and externally located pumps may be unnecessary. In such event, it would be useful to have the burner, the various pumps, the heat exchanger, the expansion tank and the overflow bottle in a single location within a single heater casing. The casing would conveniently be relatively small to take advantage of the reduced space available on a smaller motor coach or a smaller boat.

Heretofore, the exhaust manifold connected to the burner tube has been designed for operation atop the coolant tank. The heater, being used for both RV and for marine use, conveniently requires an exhaust manifold which will allow an exhaust duct to exit the exhaust manifold in an "up" configuration for marine installations and a "down" configuration for RV installations. The exhaust manifold, therefore, was designed to extend beyond the end of the burner tube within the coolant tank so that the exhaust manifold could have either an up or down type exhaust configuration without modifying the coolant tank. This required more space within the coolant tank which was unnecessary and undesirable.

A further disadvantage with existing systems is that the burner tube is generally located in the center of the coolant tank or at least on the vertical plane defining the center of the coolant tank. The heater heats the coolant fluid unevenly because of the conflicting directions of flow of the heated coolant and there may be zones of coolant at different temperatures within the coolant tank. This affects efficient operation of the heater where precise coolant temperatures and predictable fluid flow are desirable.

Yet a further disadvantage of existing systems is the use of a pump which is connected directly to the expansion tank which receives coolant from or provides coolant to the coolant tank. A level switch is typically positioned within the coolant tank and when the coolant is low, the level switch terminates operation of the heater. By this time, however, the expansion tank may be empty and the pump thereafter runs dry before terminating operation. Air is introduced into the fluid lines which is not desirable and is inconvenient.

Combustion burners are used in heaters incorporated in boats, recreational vehicles, trailers and the like as is well known. Some of such heaters use diesel fuel and others use propane or liquefied natural gas. In some applications, such heaters are used to supply heated potable water as well as to supply a heated coolant used for space heating within the vehicle or vessel. The heated potable water is generally heated using a coolant which circulates through a heated coolant tank and exchanges heat with the water by way of a heat exchanger. Such a system is described and illustrated, for example, in our U.S. Pat. No. 7,036,746, the contents of which are incorporated herein by reference.

Heretofore, the heat exchanger has been located externally of the casing at a location remote from the heater. Such an configuration has a remotely located heat exchanger with a circulation pump to circulate the heated coolant is known. The use of such a configuration is useful where the space sought to be heated is large and where the temperature of the coolant circulated to the radiators is kept at a higher temperature for a longer time period. This is generally the case in larger motorhomes or recreational vehicles and larger marine vessels. The problem with such remotely located heat exchangers and water pumps is that the price increases because of the additional components necessary to utilise such a distribution module.

In some applications, however, where the space sought to be heated is smaller and where price is an important consideration, it is desirable to incorporate the heat exchanger within the heater casing. In that case, the number of components used can be reduced and the hoses used for circulating the water to the radiators and to the potable water circuit can be kept to a minimum length. Various improvements have been discovered in this configuration which enhances the combination heater and heat exchanger.

SUMMARY OF THE INVENTION

According to one aspect of the invention, there is provided a heater system comprising a burner having a burner tube, said burner tube being positioned within said burner tube, said burner tube being positioned within a coolant tank and being adapted to heat the coolant in said tank, an exhaust manifold connected to said burner tube and being adapted to exhaust combustion exhaust from said coolant tank by an exhaust manifold extending outwardly of said coolant tank, said burner tube having a longitudinal axis running generally horizontally, said coolant tank having a longitudinal axis running generally parallel to said longitudinal axis of said burner tube, said longitudinal axis of said burner tube being offset horizontally sidewise a distance from said longitudinal axis of said coolant tank.

According to a further aspect of the invention, there is provided a heater having a coolant tank operable to contain coolant with a burner tube positioned within said coolant tank, an expansion tank connected to said coolant tank to receive coolant from and to supply coolant to said coolant tank, a pump operably connected to said expansion tank and a level switch to indicate the level of said coolant within said expansion tank and to terminate operation of said heater when said fluid within said expansion tank drops below a predetermined value.

According to yet a further aspect of the invention, there is provided a heater having a heater casing, a coolant tank, a burner tube within said coolant tank, a pump to pump coolant, an overflow bottle connected to said expansion tank and a heat exchanger to exchange heat between said coolant and potable water, said expansion tank, said coolant tank, said burner tube, said pump and said overflow bottle being positioned within said heater casing.

According to one aspect of the invention, there is provided a burner assembly located within a coolant tank, said burner assembly having a generally cylindrical configuration and being adapted to fit within a coolant tank recess, an exhaust assembly operable to be mounted within said coolant tank and being connected to said burner assembly such that the combustion products of said burner circulate through said exhaust assembly, said burner assembly and said coolant tank each having generally longitudinal and horizontal axes, said axis of said burner assembly being generally offset to one side of said axis of said coolant tank.

According to a second aspect of the invention, there is provided an expansion tank for allowing the expansion of coolant fluid used in a coolant heater, said expansion tank being located remotely from said heater and above said heater, a level switch operably mounted on said expansion tank to sense fluid level within said expansion tank, said level switch being operably connected to a coolant pump, said level switch terminating operation of said coolant pump when said fluid level drops below a predetermined level.

BRIEF DESCRIPTION OF THE SEVERAL VIEWS OF THE DRAWINGS

Specific embodiments of the invention will now be described, by way of example only, with the use of drawings in which.

DESCRIPTION OF SPECIFIC EMBODIMENT

Figure 2:
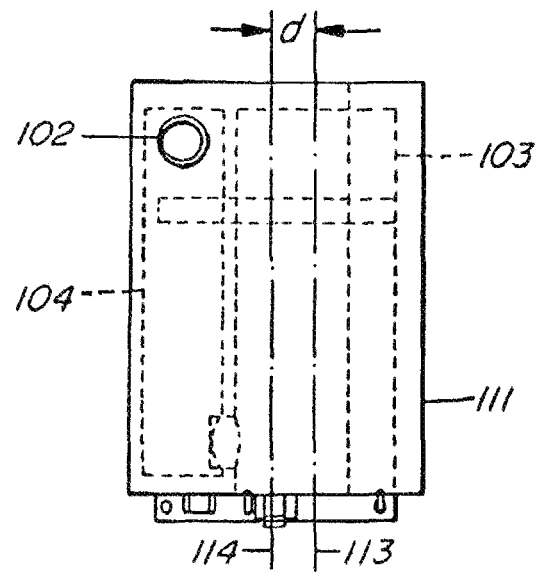
FIG. 2 is a diagrammatic partial plan view of the heater casing particularly illustrating the coolant tank and the exhaust manifold shown in phantom within the heater casing.
Figure 3:
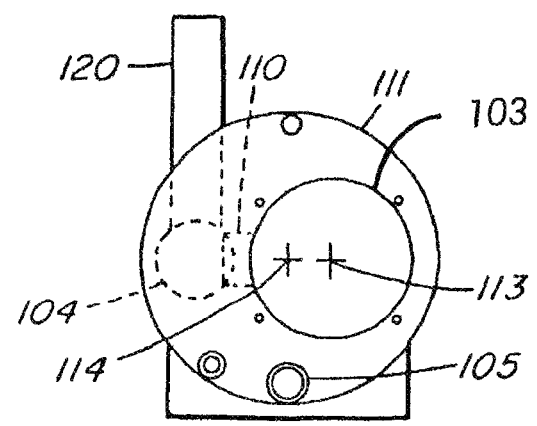
FIG. 3 is a partial diagrammatic view of the coolant tank illustrating the opening for the burner tube and the sidewise location of the exhaust manifold and exhaust pipe.

Referring now to the drawings, a coolant heater is generally illustrated at 100. It includes a heater casing 101 housing most of the components of the coolant heater 100. Such components include the burner 102, the burner tube 103 and the exhaust manifold 104 (FIG. 2) which is connected to the burner tube 103 by passageway 110 (FIG. 3). An electric element 105 is also mounted within the coolant tank 111 and is used for coolant heating when a shore connection or an RV connection is available for obtaining power. The burner tube 103, the exhaust manifold 104 and the passageway 110 are all positioned within a coolant tank 111 which contains coolant and which coolant is circulated through a heat exchanger 112 and coolant and potable water circuits under the influence of a pump 132.

Figure 1:
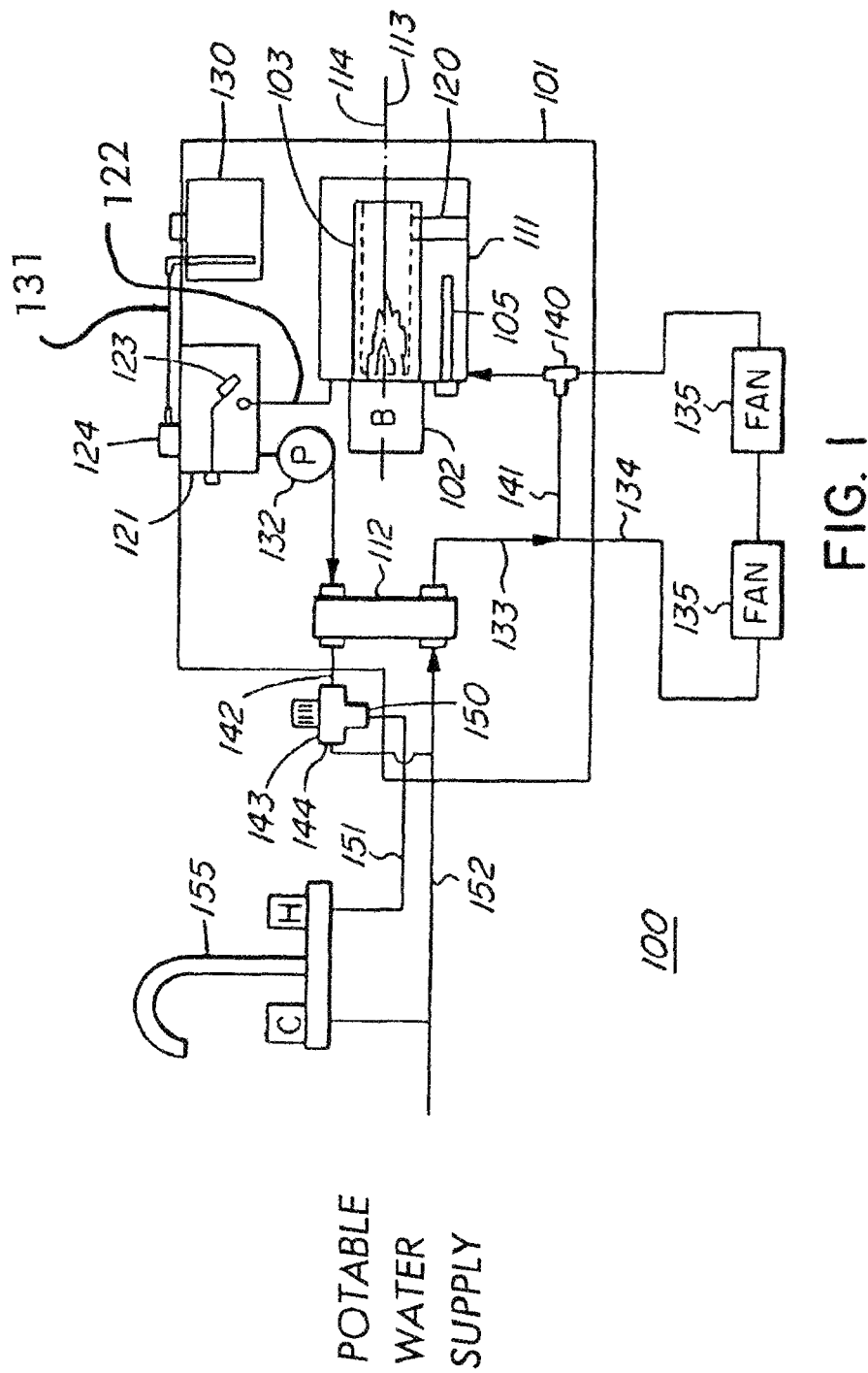
FIG. 1 is a diagrammatic schematic side view of the heater according to the invention.

The burner tube 103 has a longitudinal axis 113 which runs generally horizontally within the heater casing 101 as best seen in FIGS. 1 and 3. The coolant tank 111 similarly has a longitudinal axis 114 (FIGS. 2 and 3) which runs generally horizontally within the heater casing 101. The longitudinal axis 113 of the burner tube 103 is offset from the longitudinal axis 114 of the coolant tank 111 a distance "d" (FIG. 2). This allows substantial room to be left adjacent the burner tube 103 within the coolant tank 111 and such room is used to position the exhaust manifold 104 within the coolant tank 111 with the connecting passageway 110 extending from the burner tube 103 to the exhaust manifold 104.

In heaters used within recreational vehicles, it is generally preferable to have an exhaust duct 120 extending downwardly from the exhaust manifold 104 as seen in FIG. 1 so that it will extend through and beneath the floor of the recreational vehicle to exhaust the combustion fumes beneath the motor home. If the coolant heater 100 is being used within a boat, it is generally preferable to have the exhaust duct 120 extending upwardly from the exhaust manifold 104 so that the exhaust duct 120 can conveniently terminate in the transom of the boat within which it is installed as is illustrated in FIGS. 2 and 3. Both such configurations are easily obtained using the position of the offset burner tube 103 as has been described without the requirement for extending the exhaust manifold 104 beyond the end of the burner tube 103 which would otherwise require a larger coolant tank 111 to accommodate the longer exhaust manifold.

The expansion tank 121 is connected to the coolant tank 111 by way of coolant hose 122. The expansion tank 121 functions to receive coolant from and to supply coolant to the coolant tank 103 caused by expansion and contraction of the fluid during operation of the heater 100. The level of coolant within expansion tank 121 corresponds generally with the level of coolant within the coolant tank 103. A level switch 123 is positioned within the expansion tank 121 so that if the level of coolant in expansion tank 121 drops below a predetermined quantity, the operation of the burner 102 will terminate. A pressure cap 124 is mounted on the top of expansion tank 121 and extends from the heater casing 101. If the pressure within expansion tank 121 exceeds a predetermined quantity, conveniently seven(7) psi for a diesel fueled heater known as the HURRICANE (Trademark) heater manufactured by International Thermal Research Ltd. of Richmond, British Columbia, Canada, the pressure cap 124 will allow the coolant to pass to an overflow bottle 130 through duct 131. If the pressure within expansion tank 121 drops below zero psi, the coolant will return to the expansion tank 121.

The bottom of expansion tank 121 exits to circulation pump 132 which pumps the coolant from the expansion tank 121 to heat exchanger 112 and thence to the remainder of the hydronic coolant loop 133 which exits from the heater exchanger 112. One loop 134 extends from the heater casing 101 to radiators or fans 135 where the heated coolant is used for space heating within the boat or coach. The heated coolant then returns to the coolant tank 111 through a three-way valve 140. If the coach or boat is being heated, the three-way valve 140 will be in the open position to allow such circulation of heated coolant through loop 134. If, however, there is no heating required such as in the summer months, the three-way valve 140 is manually closed thus preventing flow through loop 134 and allowing the coolant from heat exchanger 112 to return directly to coolant tank 111 through coolant hose 141.

A potable water heating loop 142 also extends from the heat exchanger 112. The loop 142 enters a mixing valve 143 located outside the heater casing 101 for ready accessibility. The heated potable water from the heat exchanger 112 mixes with cool water entering the mixing valve 143 at inlet 144. The mixing valve 143 sets the temperature of the heated potable water which exits the mixing valve 143 at outlet 150 and flows into a potable water loop 151 which may service taps, showers and the like as is illustrated diagrammatically at 155. The cool potable water enters the heat exchanger 112 and mixing valve 143 from line 152 which extends from the source of potable water, conveniently an onboard water tank or a service line connected to a municipal water supply if the boat or motor coach has such a supply available.

OPERATION

The coolant heater 100 is compact in size in order to install the heater 100 is spaces of reduced dimensions. One way the heater 100 is reduced in size is to have the burner tube 103 offset sidewise from the axis 114 of the coolant tank 111. Likewise and to reduce the space required for the heater 100, the major operating components of the coolant heater 100 including the coolant tank 111, the burner tube 103, the exhaust manifold 104, the overflow bottle 130, the expansion tank 121, the circulation pump 132, the heat exchanger 112, the electric element 105 and the three-way valve 140 are all positioned within the heater casing 101.

In operation, cool potable water will be supplied through potable water line 152 to the heat exchanger 112 and to the mixing valve 143. It will be assumed that there is sufficient coolant within the coolant tank 111 to service the space heating loop 134 and that such coolant is also of a depth within the expansion tank 121 to allow the level switch 123 to indicate safe operation of the burner 102.

The burner 102 will commence operation under the influence of a thermostat or other control (not shown) and the coolant within the coolant tank 111 will be heated. Because of the offset location of the burner tube 103 within the coolant tank 111 as best seen in FIG. 3, the heated burner tube 103 will set the coolant in motion due to the uneven heating of the coolant. This coolant motion will more uniformly distribute the temperature of the coolant throughout the coolant tank 111. The exhaust from the combustion within the burner tube 103 will flow through passageway 110 to the exhaust manifold 104. The exhaust will exit the exhaust manifold 104 either from an "up" configuration as is illustrated in FIGS. 2 and 3 and as is used within a boat or from a "down" configuration as illustrated in FIG. 1 in which the exhaust will exit the exhaust manifold 104 downwardly.

The pump 132 connected to the expansion tank 121 which holds coolant in addition to that coolant in coolant tank 111 will commence operation when the coolant reaches a desired temperature under the influence of a coolant temperature transducer (not shown) and the coolant will thereby be pumped from the expansion tank 121 through heat exchanger 112 and out hydronic loop line 133. If the three-way valve 140 is open, the coolant will be displaced through space heating loop 134 to fans 135 where space heating within the coach or boat will occur and where, thereafter, the coolant will return to the coolant tank 111 through the three-way valve 140. If the three-way valve 140 is closed, the coolant in line 133 will return directly to the coolant tank 111 through line 141 and three-way valve 140 without passing through the space heating loop 134.

The potable water supply (not shown) is supplying cool potable water to the heat exchanger 112 and to the mixing valve 143 through line 152. The cool water will be heated within the heat exchanger 112 and will pass to the mixing valve 143 where adjustment of the mixing valve 143 will set the outlet water temperature which potable water is then passed to the heated potable water loop 151 at the desired temperature.

In the event there is a coolant leak or if another event causes the level switch 123 to close, thereby indicating a lack of coolant in the expansion tank 121, a control board (not shown) will immediately shut down the burner 102 to prevent any overheating or other damage caused by low coolant. The pump 132 will remain running until the coolant within the coolant tank 111 cools to a predetermined temperature. Since the level switch 123 is within the expansion tank, the heater terminates operation while fluid is still in the tank 121. This prevents the pump 132 from running dry which would require inconvenient air purging of the coolant system.

In the event the pressure within expansion tank 121 exceeds a predetermined level, conveniently seven(7) psi, the pressure cap 124 will open thereby allowing coolant to escape from the expansion tank 121 to the overflow bottle 130. When the coolant cools, the pressure within the expansion tank 121 will reduce and coolant will be returned through negative pressure to the expansion tank 130.

Figure 5A:
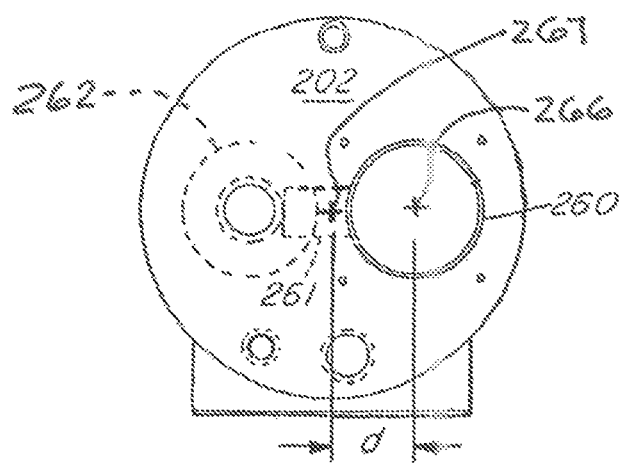
FIGS. 5A and 5B are diagrammatic end and side views, respectively, of the coolant tank particularly illustrating the mounting positions of the burner tube and exhaust manifold.
Figure 5B:
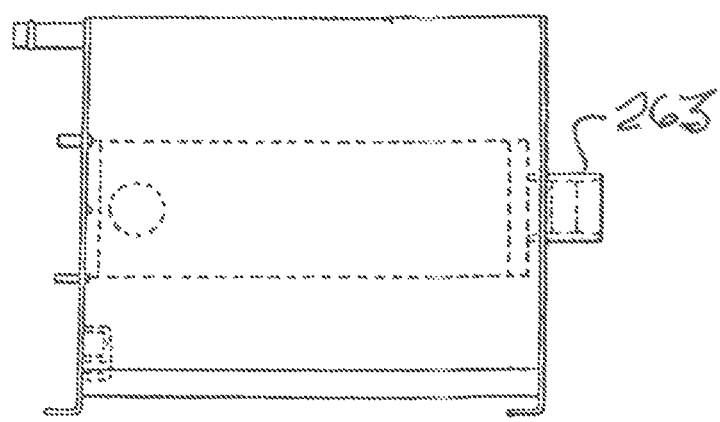

Reference is now made to FIGS. 5A and 5B which diagrammatically illustrate the coolant heater tank 202. A cylindrical recess 260 is used for the insertion of a burner tube (not illustrated) which carries the fuel nozzle, the flame sensor, the fuel regulator and the combustion air fan (not illustrated). When the burner tube is inserted into recess 260 and combustion is initiated, the combustion byproducts exhaust through duct 261 and enter the exhaust jacket 262. The exhaust passes through the exhaust jacket 262 in coolant tank 202 and exits through an elbow on exhaust 263 where it may be directed up or down (FIG. 3) depending on the operating environment of the heater.

Figure 4:
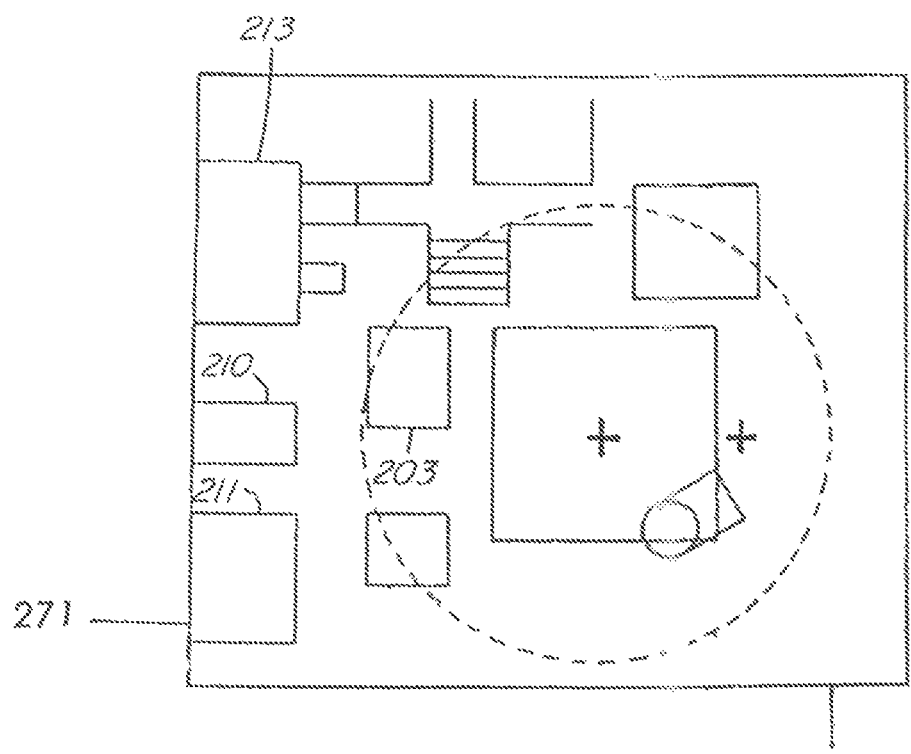
FIG. 4 is a diagrammatic view of the heater according to the invention, particularly illustrating the components located within the casing.
Figure 6A:
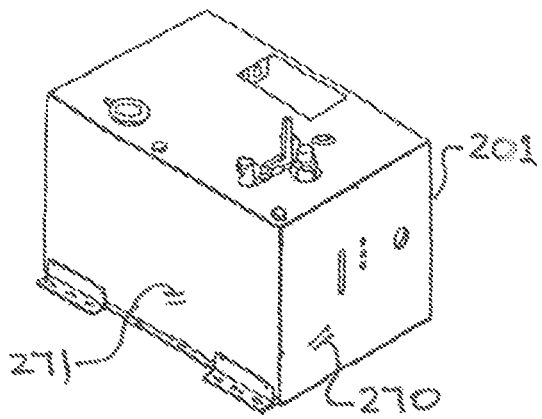
FIGS. 6A, 6B, 6C and 6D and are diagrammatic isometric, plan, side and front views, respectively, of the heater casing.
Figure 6C:
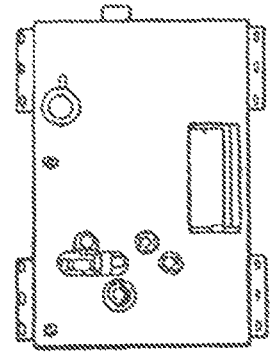
Figure 6B:
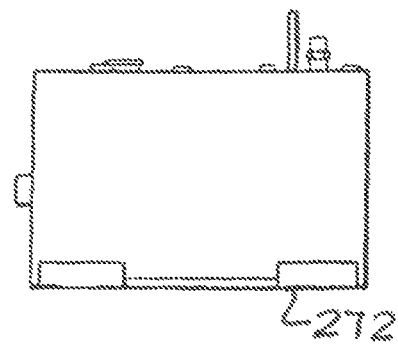
Figure 6D:
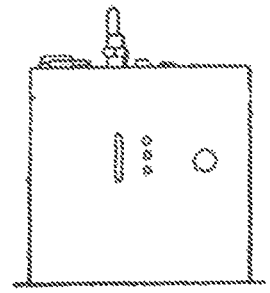
Figure 7:
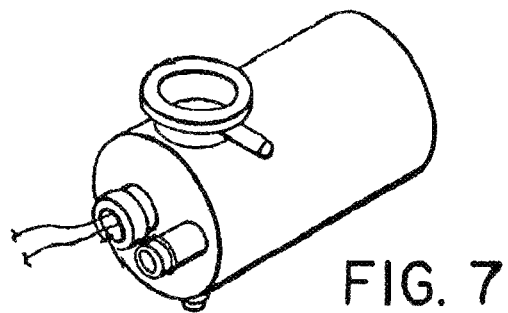
FIG. 7 is a diagrammatic view of the expansion tank.

It will be specifically noted that the burner tube (not illustrated) is inserted into recess 260 which has an axis 266 offset from the axis 267 of coolant tank 202. The horizontal offset "d" of the burner tube recess 260 allows a variety of components to be located leftwardly of the burner tube following its insertion into recess 260 as viewed in FIG. 5A. For example and with reference to FIGS. 4 and 8, the heat exchanger 213, the fuel pump 210 and its associated fuel filter (not illustrated), the air compressor 211, the coolant circulating pump 203, the mixing valve 112 and the summer-winter valve 140 (FIG. 1) may all be located leftwardly of the burner tube recess 260 (FIG. 5A) which allows access to the user by removing the forward panel member 270 (FIG. 6A of the casing 201. In fact, many of the components could be mounted on the side panel 271. In this case, with components such as the heat exchanger 213 and the fuel pump 205 mounted on the side panel 272 and the mounting of the air compressor 211 being optionally mounted on either the side panel 271 or the bottom panel 272 (FIG. 6B), mounting of such components on the side panel 271 prior to assembly of the heating casing 201 itself would allow for ease of production with only the connection of the various hoses needed after assembly of the side panel 271 to the rest of the casing 201.

Figure 8:
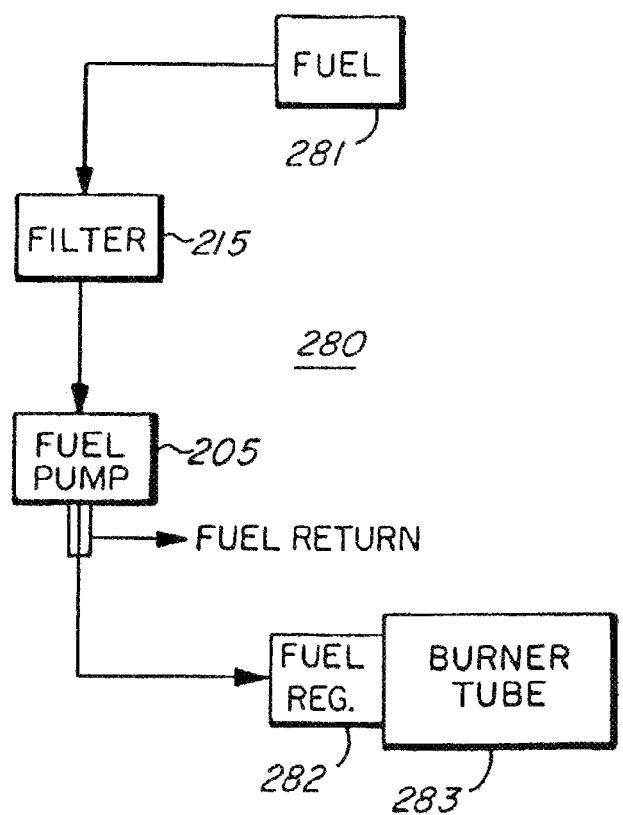
FIG. 8 is a diagrammatic view of the fuel circuit for the heater according to the invention.

The fuel circuit is generally illustrated at 280 in FIG. 8. It comprises the fuel pump 205 and its associated fuel filter 215. Fuel from a fuel source 281 passes through the filter 215 and into the fuel pump 205. The fuel passes to the fuel regulator 282 which may be conveniently mounted on the burner tube 283 which is thereafter mounted in the burner recess 260 (FIG. 5A). Any excess fuel over what is required for fuel combustion passes back to the fuel source or fuel tank 281.

In addition to greater convenience for component placement, the offset mounting of the burner tube 260 results in a greater heating effect to the coolant located between the outside of the burner tube 260 and the inside of the coolant tank 202. This heating results in a circulation being imposed on the coolant within the tank 202 thereby allowing the coolant in the tank 202 to be maintained at a more even temperature throughout the coolant tank 202.

Many modifications are readily contemplated. For example, mixing valve 143 may be manually or automatically adjusted and likewise for three-way valve 140. Many further modifications will readily occur to those skilled in the art to which the invention relates and the particular embodiments described are given by way of example only and are not intended as limiting the scope of the invention as defined in accordance with the accompanying claims.

I claim:

1. A heater system comprising a burner having a burner tube, said burner being positioned within said burner tube, said burner tube being positioned within a coolant tank holding coolant, said burner tube being adapted to heat said coolant in said coolant tank, an exhaust manifold connected to said burner tube and being within said coolant tank, said exhaust manifold being adapted to exhaust combustion exhaust from said coolant tank by an exhaust duct extending vertically within said coolant tank and outwardly and vertically from said coolant tank, said burner tube having a longitudinal axis running horizontally, said coolant tank having a longitudinal axis running parallel to said longitudinal axis of said burner tube, said longitudinal axis of said burner tube being offset horizontally sidewise a distance from said longitudinal axis of said coolant tank, said exhaust manifold being positioned within said coolant tank sidewise of said burner tube, said coolant tank being connected to an expansion tank, said expansion tank being operable to receive coolant fluid from said coolant tank and to provide coolant to said coolant tank, a pump connected to said expansion tank to pump said coolant fluid from said expansion tank, a level switch within said expansion tank to indicate insufficient coolant fluid within said expansion tank and control means to shut down operation of said burner when said level switch indicates insufficient fluid within said coolant tank.

2. A heater system as in claim 1 wherein said exhaust duct exhausts said combustion exhaust upwardly from said exhaust manifold and said coolant tank.

3. A heater system as in claim 1 wherein said exhaust duct exhausts said combustion exhaust downwardly from said exhaust manifold and said coolant tank.

4. A heater system as in claim 1 and further comprising an overflow bottle connected to said expansion tank, said overflow bottle being connected to said expansion tank and being adapted to receive overflow fluid from said expansion tank and to supply fluid to said expansion tank when the pressure in said expansion tank becomes negative.

5. A heater system as in claim 4 and further comprising a heat exchanger operably connected to said pump, said coolant fluid being pumped from said expansion tank through said heat exchanger.

6. A heater system as in claim 5 and further comprising a mixing valve connected to said heat exchanger and to a source of potable water.

7. A heater system as in claim 6 and further comprising an electric element within said coolant tank.

8. A heater system as in claim 5 wherein said coolant tank, said expansion tank, said overflow bottle, said pump and said heat exchanger are enclosed within a heater casing.

9. A heater system as in claim 6 wherein said coolant tank, said expansion tank, said overflow bottle, said pump and said heat exchanger are enclosed within a heater casing and said mixing valve is located outside said heater casing.

10. A heater system as in claim 9 wherein said expansion tank has a pressure cap, said pressure cap being located outside said heater casing.

\* \* \* \* \*